US010737657B2

(12) United States Patent
Funahashi et al.

(10) Patent No.: US 10,737,657 B2
(45) Date of Patent: Aug. 11, 2020

(54) PEDESTRIAN PROTECTING DEVICE

(71) Applicant: MAZDA MOTOR CORPORATION, Aki-gun, Hiroshima (JP)

(72) Inventors: Ryouji Funahashi, Aki-gun (JP); Tsutomu Watanabe, Hiroshima (JP); Susumu Kuroda, Higashihiroshima (JP); Motoharu Sato, Aki-gun (JP); Yuji Nakanishi, Aki-gun (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 85 days.

(21) Appl. No.: 16/082,603

(22) PCT Filed: Mar. 15, 2017

(86) PCT No.: PCT/JP2017/010463
§ 371 (c)(1),
(2) Date: Sep. 6, 2018

(87) PCT Pub. No.: WO2017/169796
PCT Pub. Date: Oct. 5, 2017

(65) Prior Publication Data
US 2019/0092272 A1 Mar. 28, 2019

(30) Foreign Application Priority Data
Mar. 29, 2016 (JP) .................. 2016-066584

(51) Int. Cl.
*B60R 21/36* (2011.01)
*B60R 21/2346* (2011.01)
(Continued)

(52) U.S. Cl.
CPC ............ *B60R 21/36* (2013.01); *B60R 21/231* (2013.01); *B60R 21/2346* (2013.01); *B60S 1/08* (2013.01);
(Continued)

(58) Field of Classification Search
CPC ... B60R 21/36; B60R 21/231; B60R 21/2346; B60R 21/38; B60R 21/01;
(Continued)

(56) References Cited

U.S. PATENT DOCUMENTS 5,031,929 A * 7/1991 Henseler ............... B60R 21/231
280/730.1
7,390,014 B2 * 6/2008 Takimoto ............... B60R 21/36
180/274

(Continued)

FOREIGN PATENT DOCUMENTS

JP 4331649 A 11/1992
JP 07232615 A 9/1995
(Continued)

OTHER PUBLICATIONS

European Patent Office, Supplemental European Search Report Issued in Application No. 17774340.8, dated Nov. 21, 2018, Germany, 9 pages.

*Primary Examiner* — Drew J Brown
(74) *Attorney, Agent, or Firm* — Alleman Hall Creasman & Tuttle LLP

(57) ABSTRACT

A pedestrian protecting device according to one aspect of the present invention includes: a right air bag device including a right air bag configured to be deployed at a right region of the windshield; and a left air bag device including a left air bag configured to be deployed at a left region of the windshield. A wiper device includes a right wiper and a left wiper including a turning fulcrum located closer to a middle portion of a vehicle than a turning fulcrum of the right wiper. The right and left air bags and include respective tip end portions that vertically overlap each other at the middle portion of the vehicle. The right air bag of the air bag device is deployed before the left air bag of the air bag device is deployed.

7 Claims, 6 Drawing Sheets

(51) Int. Cl.
  *B62D 25/10* (2006.01)
  *B60S 1/08* (2006.01)
  *B60R 21/231* (2011.01)
  *B60R 21/01* (2006.01)
  *B60R 21/38* (2011.01)
  *B60S 1/04* (2006.01)
  *B62D 25/08* (2006.01)

(52) U.S. Cl.
  CPC .............. *B62D 25/10* (2013.01); *B60R 21/01* (2013.01); *B60R 21/38* (2013.01); *B60R 2021/01231* (2013.01); *B60S 1/0452* (2013.01); *B62D 25/081* (2013.01)

(58) Field of Classification Search
  CPC ............. B60R 2021/01231; B60S 1/08; B60S 1/0452; B62D 25/10; B62D 25/081
  See application file for complete search history.

(56) References Cited

U.S. PATENT DOCUMENTS

| | | | | |
|---|---|---|---|---|
| 7,712,767 | B2* | 5/2010 | Takahashi | B60R 21/36 |
| | | | | 180/274 |
| 7,845,454 | B2* | 12/2010 | Takimoto | B60R 21/2338 |
| | | | | 180/274 |
| 8,104,563 | B2* | 1/2012 | Narita | B60R 21/36 |
| | | | | 180/274 |
| 9,132,799 | B1* | 9/2015 | Choi | B60R 21/36 |
| 9,731,677 | B1* | 8/2017 | Belwafa | B60R 21/233 |
| 10,471,927 | B1* | 11/2019 | Gupta | B60R 21/0134 |
| 2009/0001691 | A1* | 1/2009 | Takimoto | B60R 21/36 |
| | | | | 280/728.1 |
| 2009/0200778 | A1* | 8/2009 | Ishikawa | B60R 21/2338 |
| | | | | 280/739 |
| 2010/0059972 | A1* | 3/2010 | Kim | B60R 21/0136 |
| | | | | 280/728.2 |
| 2010/0230944 | A1 | 9/2010 | Narita et al. | |
| 2014/0265271 | A1* | 9/2014 | Dinsdale | B60R 21/23138 |
| | | | | 280/730.2 |
| 2014/0361521 | A1* | 12/2014 | Fukawatase | B60R 21/231 |
| | | | | 280/730.1 |
| 2015/0217719 | A1* | 8/2015 | Vitet | B60R 21/36 |
| | | | | 180/274 |
| 2016/0288764 | A1* | 10/2016 | Suzuki | B60R 21/36 |

FOREIGN PATENT DOCUMENTS

| | | |
|---|---|---|
| JP | 09030368 A | 2/1997 |
| JP | 200644289 A | 2/2006 |
| JP | 2007196795 A | 8/2007 |
| JP | 2007203815 A | 8/2007 |
| JP | 2007308110 A | 11/2007 |
| JP | 2008184149 A | 8/2008 |
| JP | 200951500 A | 3/2009 |

* cited by examiner

PEDESTRIAN PROTECTING DEVICE

TECHNICAL FIELD

The present invention relates to a pedestrian protecting device configured to protect a pedestrian who has collided with a vehicle.

BACKGROUND ART

A vehicle equipped with a pedestrian protecting device configured to protect a pedestrian when the vehicle has collided with the pedestrian is being developed in recent years. Known as this type of pedestrian protecting device is, for example, a device configured to expand and deploy (hereinafter simply referred to as "deploy") a pair of right and left air bags from a rear end portion of a hood and absorb an impact received by the pedestrian (PTL 1). PTL 2 proposes a pedestrian protecting device in which: right and left air bags are formed such that tip end portions of the right and left air bags vertically overlap each other, i.e., vehicle middle-side end portions of the right and left air bags vertically overlap each other; and with this, the right and left air bags are deployed without forming a gap between the right and left air bags. According to this pedestrian protecting device, since the pedestrian is prevented from getting into the gap between the right and left air bags, this is effective for improving pedestrian impact absorption performance.

CITATION LIST

Patent Literature

PTL 1: Japanese Laid-Open Patent Application Publication No. 2006-44289

PTL 2: Japanese Laid-Open Patent Application Publication No. 2007-196795

SUMMARY OF INVENTION

Technical Problem

In the pedestrian protecting device configured such that the tip end portions of the right and left air bags overlap each other, each of thicknesses of the tip end portions tends to be made thin for easily overlapping the air bags with each other while securing a certain thickness. However, when the thicknesses of the tip end portions of the air bags are made thin, smooth deployments of the air bags may be inhibited. For example, during the deployments, the tip end portions of the air bags hit against each other and bounce. Therefore, this needs to be improved.

The present invention was made under the above circumstances, and an object of the present invention is to more smoothly and surely deploy right and left air bags while overlapping each other.

Solution to Problem

To solve the above problems, the applicant of the present application thought of an idea of deploying the right and left air bags with a time difference. This suppresses the phenomenon in which the tip end portions of the air bags hit against each other and bounce. However, according to the pedestrian protecting device configured to deploy the air bags from a lower surface side of the rear end portion of the hood as in PTL 2, the right and left air bags are deployed so as to cover wipers, so that, for example, the air bag may be caught by the wiper in the process of the deployment, and this may delay the deployment of the air bag. As a result, the tip end portions of the right and left air bags may hit against each other, and this may inhibit the deployments of the air bags. Therefore, it is more desirable to solve such problems.

Such problems are solved by the present invention described below. To be specific, the present invention is a pedestrian protecting device mounted on a vehicle, the vehicle including: a pair of wipers arranged at a cowl portion located in front of a windshield, the wipers being configured to swing in the same direction; and a hood covering an engine room and including a rear end portion located above the cowl portion, the pedestrian protecting device including: when one side of a middle portion of the vehicle in a vehicle width direction is defined as a first region, and the other side of the middle portion of the vehicle in the vehicle width direction is defined as a second region, a first air bag device arranged under the rear end portion of the hood in the first region, the first air bag device including a first air bag configured to be deployed at a portion of the windshield which portion belongs to the first region; and a second air bag device arranged under the rear end portion of the hood in the second region, the second air bag device including a second air bag configured to be deployed at a portion of the windshield which portion belongs to the second region, wherein: the pair of wipers includes a first wiper configured to mainly wipe the portion of the windshield which portion belongs to the first region, and a second wiper configured to mainly wipe the portion of the windshield which portion belongs to the second region, the second wiper including a turning fulcrum located at a position closer to the middle portion of the vehicle than a turning fulcrum of the first wiper; the first and second air bags include respective tip end portions which vertically overlap each other at the middle portion of the vehicle in the vehicle width direction; and a deployment of the tip end portion of the first air bag of the first air bag device is completed before a deployment of the tip end portion of the second air bag of the second air bag device is completed.

According to this configuration, the deployment of the tip end portion of the second air bag is completed after the deployment of the tip end portion of the first air bag is completed. Therefore, a phenomenon in which the tip end portions of the first and second air bags hit against each other and bounce at the time of the deployments of the first and second air bags hardly occurs. Further, the tip end portion of the first air bag is deployed first since it is hardly disturbed (hardly caught) by the wiper blades of the first and second wipers at the time of the deployment of the air bag due to a positional relation between the regions where the first and second air bags are deployed and the first and second wipers. Therefore, the deployment of the tip end portion of the first air bag can be more surely completed before the deployment of the tip end portion of the second air bag is completed. On this account, the first and second air bags can be more smoothly and surely deployed while overlapping each other.

In the above pedestrian protecting device, it is preferable that at least one of the first air bag and the second air bag include a guide portion configured to guide the tip end portion of the second air bag to an upper side of the tip end portion of the first air bag.

According to this configuration, the tip end portion of the second air bag easily overlap an upper side of the tip end portion of the first air bag that is deployed first. Therefore, the first and second air bags can be more smoothly and surely deployed while overlapping each other.

As a more specific configuration, the vehicle includes pillar portions extending in an upper-lower direction, the pillar portions being located at both respective vehicle width direction ends of the windshield; the tip end portion of the first air bag of the first air bag device is filled with deployment gas before an end portion, located close to the corresponding pillar portion, of the first air bag of the first air bag device is filled with the deployment gas; and an end portion, located close to the corresponding pillar portion, of the second air bag of the second air bag device is filled with the deployment gas before the tip end portion of the second air bag of the second air bag device is filled with the deployment gas.

According to this configuration, even when the first and second air bag devices are simultaneously operated, that is, even when the first and second air bags are simultaneously started to be filled with the gas, the deployment of the tip end portion of the first air bag can be eventually completed before the deployment of the tip end portion of the second air bag is completed.

In this case, more specifically, each of the first and second air bags may include an air bag base portion extending in the vehicle width direction along the cowl portion, an air bag side portion extending from the air bag base portion in the upper-lower direction along the corresponding pillar portion, and a deployment gas channel formed in the air bag base portion and the air bag side portion; the deployment gas channel of the first air bag may have such a shape that the air bag base portion is filled with the deployment gas before the air bag side portion is filled with the deployment gas; and the deployment gas channel of the second air bag may have such a shape that the air bag side portion is filled with the deployment gas before the air bag base portion is filled with the deployment gas.

According to this configuration, regarding the first and second air bag devices including the first and second air bags configured to be deployed so as to cover the cowl portion and both of the pillar portions, the deployment of the tip end portion of the first air bag can be satisfactorily completed before the deployment of the tip end portion of the second air bag is completed.

As another specific configuration, the pedestrian protecting device may include a controller configured to control operations of the first and second air bag devices such that the first air bag is operated before the second air bag is operated.

According to this configuration, since the first air bag device is operated before the second air bag device is operated, the deployment of the tip end portion of the first air bag is completed before the deployment of the tip end portion of the second air bag is completed.

In this case, the controller may always operate the first air bag first before operating the second air bag. However, the controller may control the operations of the first and second air bag devices such that only when the first wiper is operating, the first air bag is operated before the second air bag is operated.

To be specific, while the wipers are operating, especially the second wiper tends to disturb the deployment of the second air bag. Therefore, only in such a case, the air bags may be deployed with a time difference.

Further, in the above pedestrian protecting device, it is useful that: the cowl portion includes a cowl grill, the cowl grill including a level difference portion, a rear side of the level difference portion being located lower than a front side of the level difference portion; and the first and second wipers are arranged at the level difference portion.

According to this configuration, when the first and second air bag devices are arranged between the rear end portion of the hood and the cowl portion, the first and second wipers hardly disturb the deployments of the first and second air bags. Therefore, the right and left air bags can be more smoothly and surely deployed.

Further, in the above pedestrian protecting device, it is preferable that: the tip end portion of the second air bag have a shape that tapers from a front side toward a rear side in a vehicle front-rear direction; and the tip end portion of the first air bag have a shape that tapers from the rear side toward the front side.

According to this configuration, the air bag (second air bag) located at an upper side hardly moves backward, and therefore, a pedestrian impact absorption ability further improves.

Advantageous Effects of Invention

As explained above, according to the pedestrian protecting device of the present invention, the right and left (first and second) air bags can be more smoothly and surely deployed while overlapping each other.

BRIEF DESCRIPTION OF DRAWINGS

FIG. 5A shows that air bags are deploying, and FIG. 5B shows that the deployments of the air bags are completed.

DESCRIPTION OF EMBODIMENTS

Hereinafter, a preferred embodiment of the present invention will be explained in detail with reference to the attached drawings.

Entire Configuration

Figure 1:
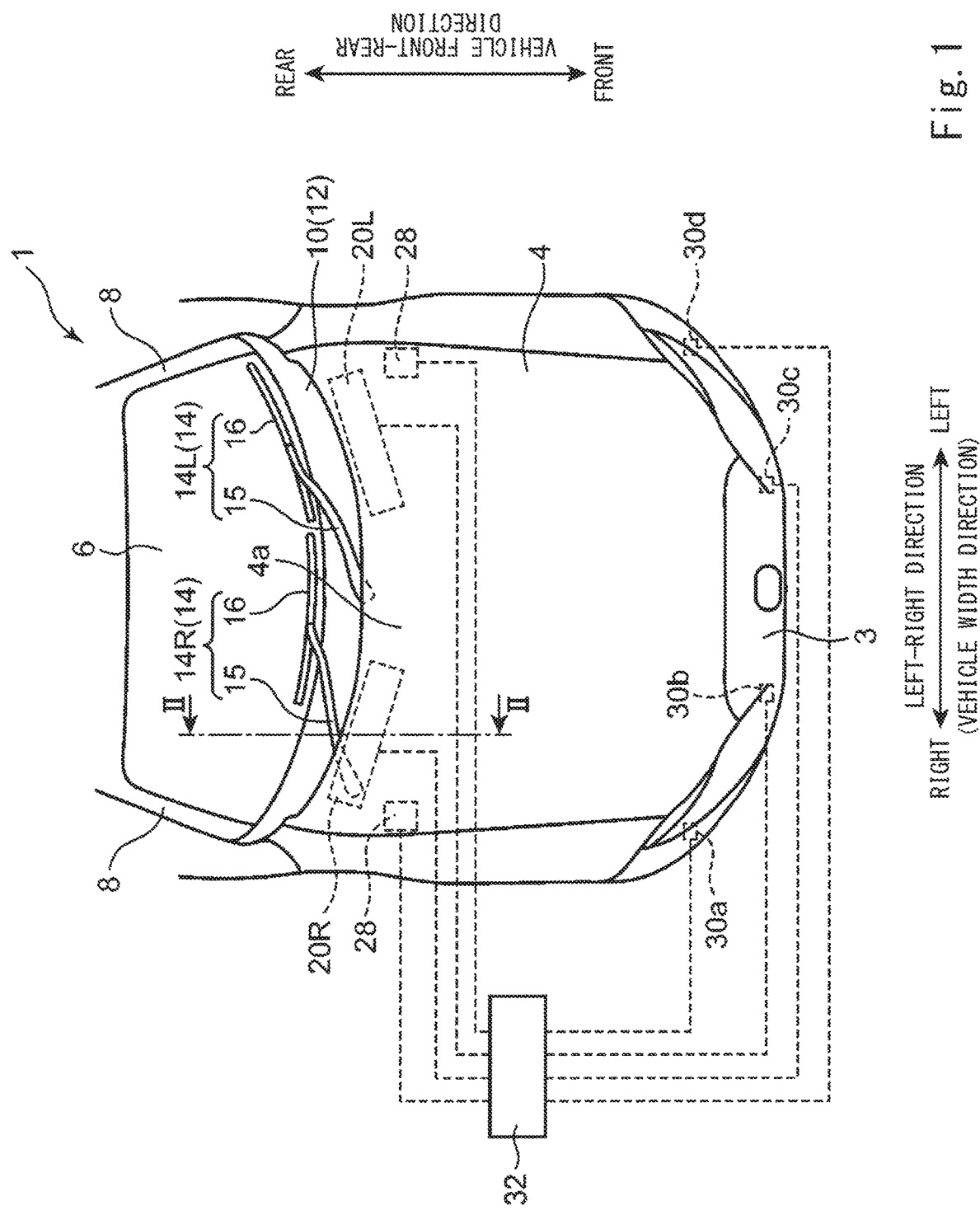
FIG. 1 is a plan view showing a vehicle (automobile) equipped with a pedestrian protecting device according to the present invention.
Figure 2:
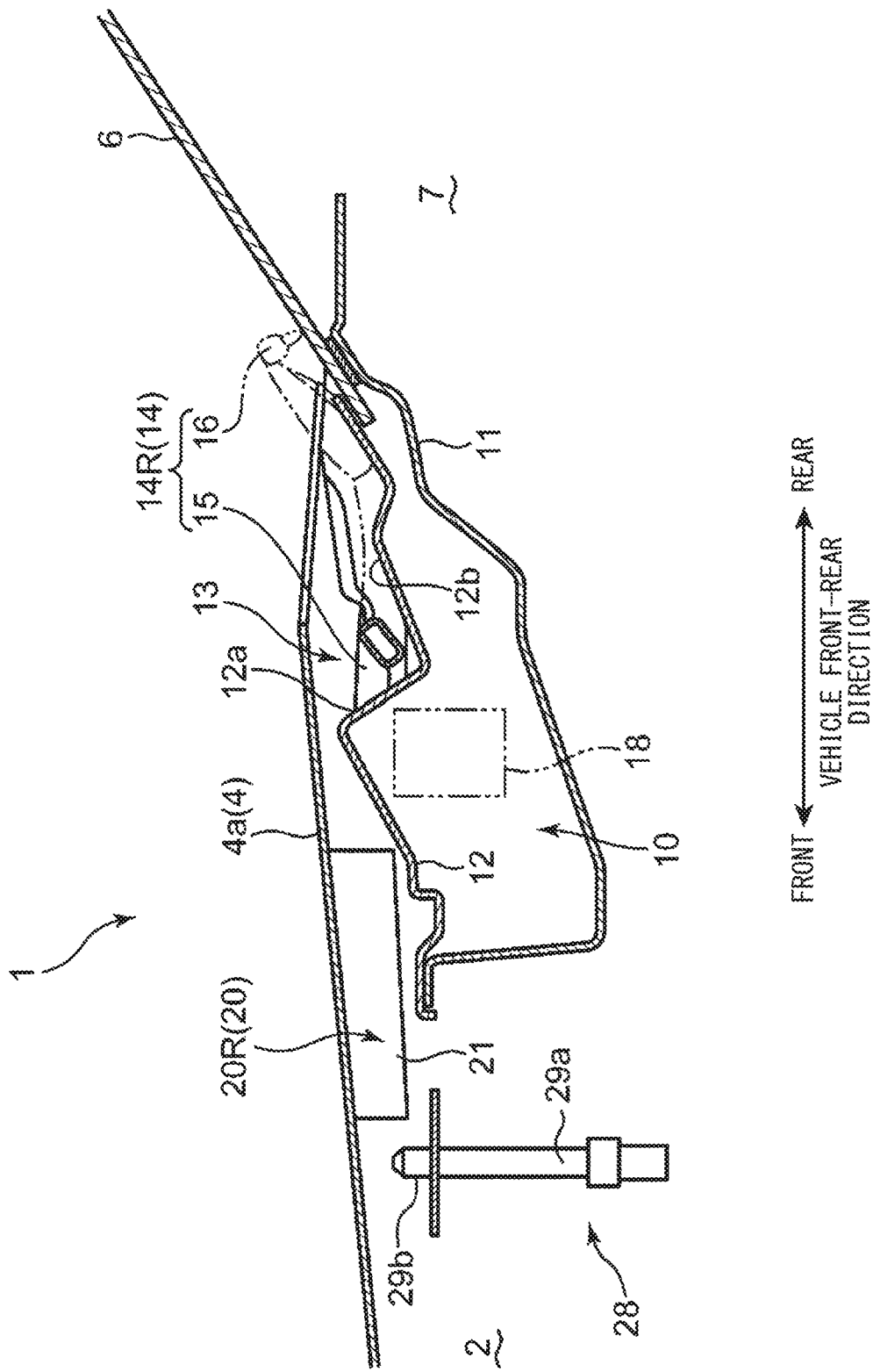
FIG. 2 is a sectional view of the vehicle (a sectional view taken along line II-II of FIG. 1).

FIG. 1 is a plan view showing a vehicle 1 equipped with a pedestrian protecting device according to the present invention. FIG. 2 is a sectional view of the vehicle 1 (a sectional view taken along line II-II of FIG. 1). The vehicle 1 is a right-hand drive automobile including a driver's seat at a right side and a front passenger seat at a left side. In the vehicle 1, based on a vehicle width direction middle portion as a boundary, a right side corresponds to a first region of the present invention, and a left side corresponds to a second region of the present invention.

As shown in FIGS. 1 and 2, the vehicle 1 includes: a hood 4 (also called a hood panel) covering an engine room 2 located at a front portion of the vehicle 1; a bumper face 3 provided in front of the engine room 2; a windshield 6 covering a vehicle room 7 located behind the engine room 2; and a cowl portion 10 located in front of the windshield 6.

Figure 4:
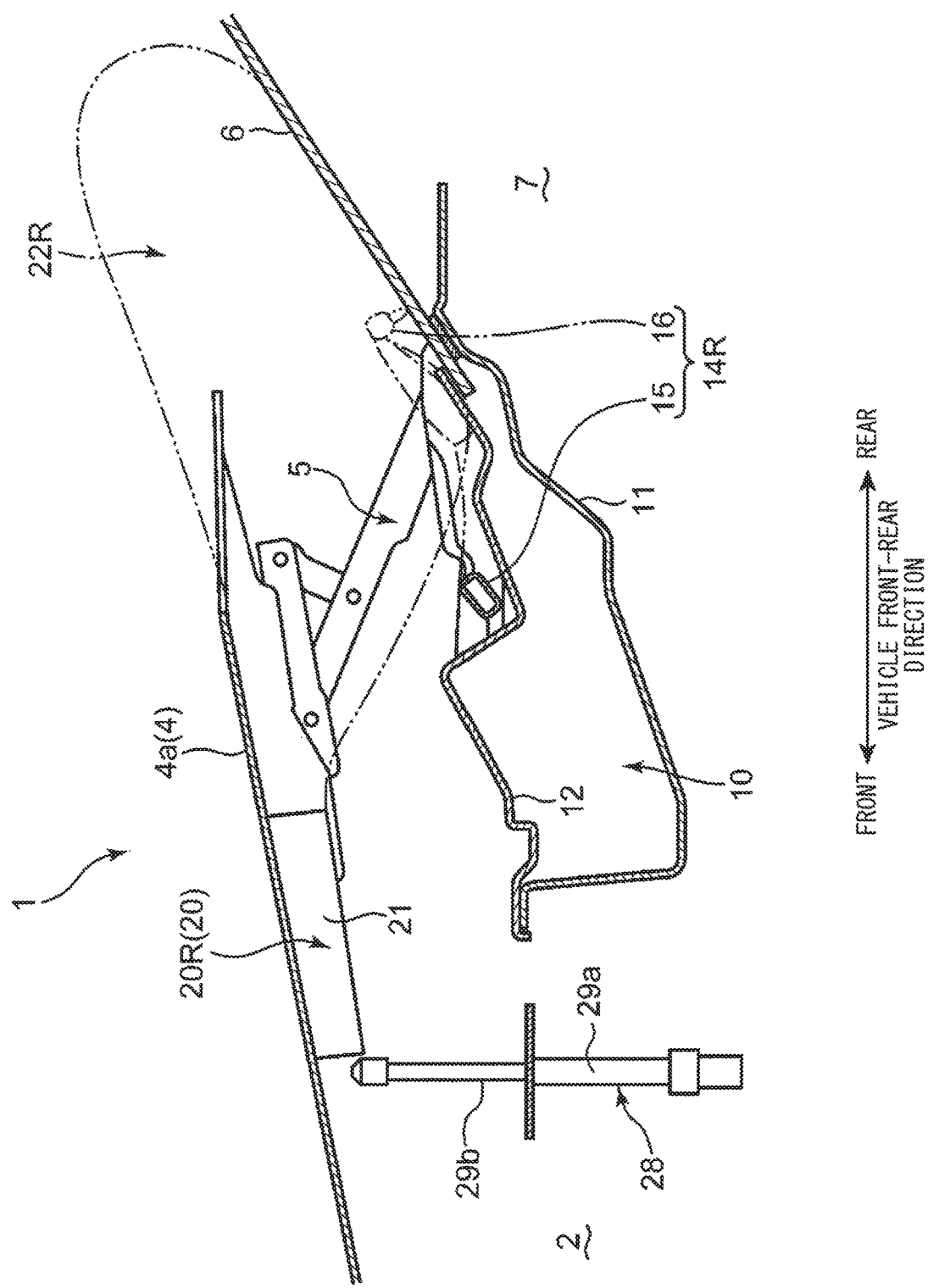
FIG. 4 is a sectional view of the vehicle (a sectional view taken along line IV-IV of FIG. 3).

The hood 4 is provided at the front portion of the vehicle 1. The hood 4 is constituted by one or a plurality of panels made of an aluminum alloy and is configured to be relatively easily deformable with respect to a collision from outside. The hood 4 is supported by a vehicle body at both right and left end positions of a rear end portion 4a through hinge mechanisms 5 (see FIG. 4) so as to be openable and closable. Normally, the hinge mechanisms 5 couple the rear end portion 4a and the vehicle body such that the hood 4 opens and closes at a front side. On the other hand, when below-described pop-up actuators 28 are operated by collision with a pedestrian, the hinge mechanisms 5 receive push-up force, applied by the pop-up actuators 28 from below, to deform as shown in FIG. 4, and thus, allows flip-up (pop-up) of the rear end portion 4a of the hood 4. With this configuration, in the collision with the pedestrian, the deformation of the hood 4 is promoted by the formation of an adequate space under the hood 4, and thus, impact applied to the pedestrian is eased.

Both right and left ends of the windshield 6 are supported by A-pillars 8 (corresponding to pillar portions of the present invention) each of which is a part of the vehicle body. A front end portion of the windshield 6 is supported by the vehicle body through a sealing member and a cowl panel 11.

The cowl portion 10 is constituted by the cowl panel 11 and a cowl grill 12 arranged at an upper side of the cowl panel 11. A wiper device 14 is provided at the cowl portion 10.

The wiper device 14 includes a right wiper 14R, a left wiper 14L, and a drive mechanism. The right wiper 14R is arranged close to the driver's seat and mainly wipes a region spreading from a middle portion of the windshield 6 to a right side. The left wiper 14L is arranged close to the front passenger seat and mainly wipes a region spreading from the middle portion of the windshield 6 to a left side. The drive mechanism is arranged under the cowl grill 12. In this example, the right wiper 14R corresponds to a first wiper of the present invention, and the left wiper 14L corresponds to a second wiper of the present invention.

Although not shown in detail, the drive mechanism includes a pair of pivots, an electric motor 18, and a crank mechanism. The pair of pivots are rotatably supported by the cowl grill 12. The crank mechanism transmits rotational driving force of the electric motor 18 to each of the pivots while converting the rotational driving force into a repetitive motion of forward rotation and reverse rotation of the pivot. The right wiper 14R is coupled to one of the pivots, and the left wiper 14L is coupled to the other pivot. With this, the wipers 14R and 14L swing (turn) in the same direction in sync with each other.

Each of the wipers 14R and 14L includes: a wiper arm 15 having a base end portion fixed to the pivot; and a wiper blade 16 coupled to a tip end portion of the wiper arm 15. A turning fulcrum of the right wiper 14R, i.e., the base end portion (pivot) of the wiper arm 15 is located near a vehicle width direction right end portion, and a turning fulcrum of the left wiper 14L is located at the vehicle width direction middle portion. When the wiper device 14 is not in use, the wipers 14R and 14L are arranged at predetermined storage positions (positions shown in FIG. 1), i.e., the wiper blade 16 of the right wiper 14R is located at the vehicle width direction middle portion along a boundary line between the windshield 6 and the cowl grill 12, and the wiper blade 16 of the left wiper 14L is located at a left side of the wiper blade 16 of the right wiper 14R in line with the wiper blade 16 of the right wiper 14R along the boundary line.

As shown in FIG. 2, level difference portions 13 are formed at respective portions of the cowl grill 12 which portions correspond to respective movable regions of the wipers 14R and 14L (wiper arms 15). Rear sides of the level difference portions 13 are located lower than front sides of the level difference portions 13. The right and left wipers 14R and 14L are provided at the respective level difference portions 13.

A pedestrian air bag device 20 is provided between the rear end portion 4a of the hood 4 and the cowl portion 10. The pedestrian air bag device 20 includes a right air bag device 20R and a left air bag device 20L. The right air bag device 20R is fixed to a position on a rear surface of a region, located at a right side of the vehicle width direction middle portion, of the rear end portion 4a of the hood 4, the position being opposed to the base end portion of the wiper arm 15 of the right wiper 14R as shown in FIG. 1. The left air bag device 20L is arranged at a position on a rear surface of a region, located at a left side of the vehicle width direction middle portion, of the rear end portion 4a of the hood 4, and the position of the left air bag device 20L and the position of the right air bag device 20R are bilaterally symmetrical. In this example, the right air bag device 20R corresponds to a first air bag device of the present invention, and the left air bag device 20L corresponds to a second air bag device of the present invention.

Each of the air bag devices 20R and 20L includes: an air bag 22 (22R, 22L); a casing 21 accommodating the air bag 22 (22R, 22L) in a folded state; and an inflator (not shown) configured to supply gas for deployment (expansion) to the air bag 22 (22R, 22L).

Figure 3:
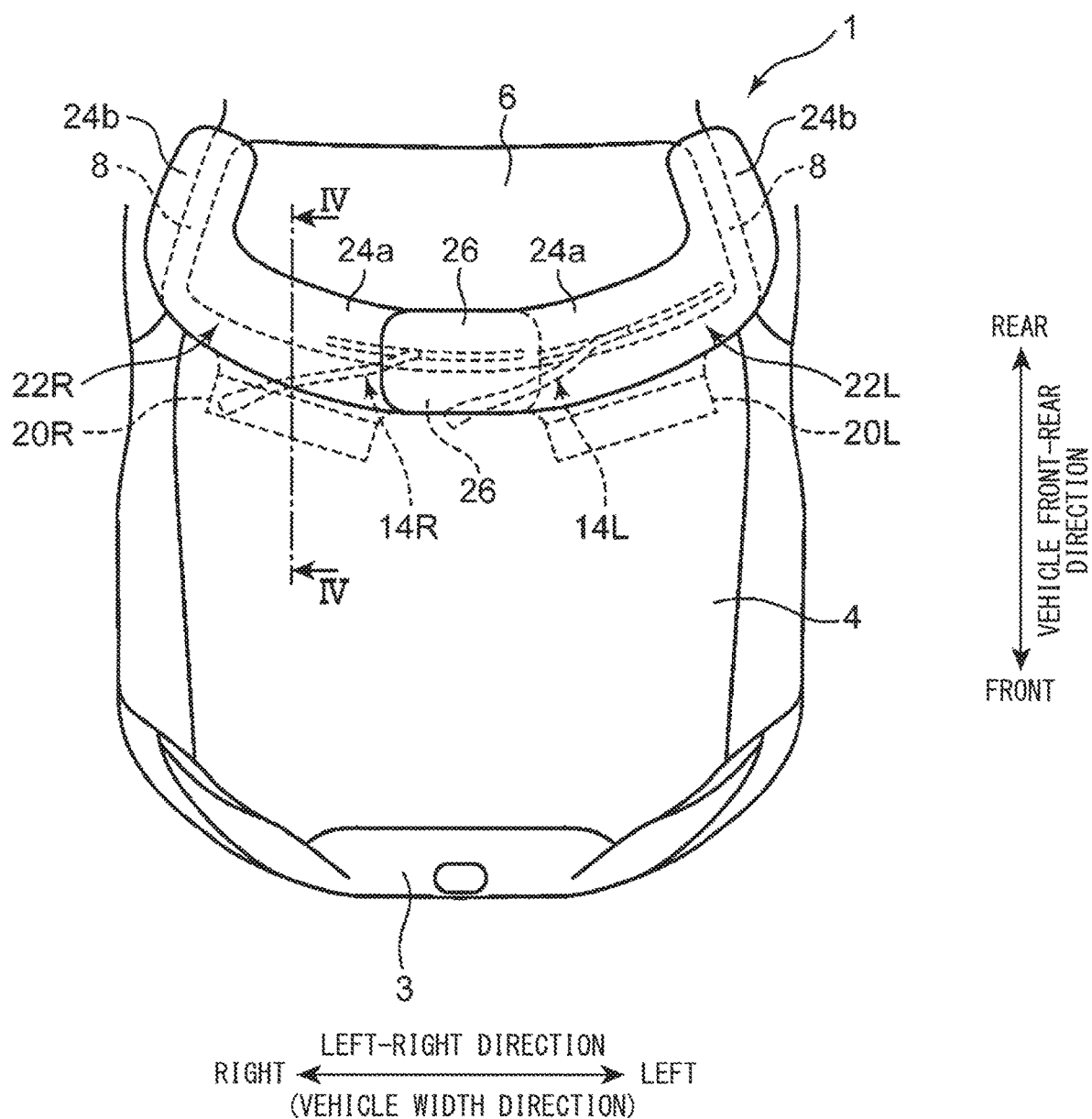
FIG. 3 is a plan view of the vehicle when air bag devices and pop-up actuators are operated.

FIG. 3 is a plan view of the vehicle 1 when the air bag devices 20R and 20L and the pop-up actuators 28 are operated. FIG. 4 is a sectional view of the vehicle 1 (a sectional view taken along line Iv-Iv of FIG. 3).

As shown in FIG. 3, the air bag (called a right air bag 22R and corresponding to a first air bag of the present invention) of the right air bag device 20R is deployed mainly in a region spreading from the vehicle width direction middle portion to a right side (driver's seat side), and the air bag (called a left air bag 22L and corresponding to a second air bag of the present invention) of the left air bag device 20L is deployed mainly in a region spreading from the vehicle width direction middle portion to a left side (front passenger seat side). With this, the air bags can widely cover a rear side of the hood 4 all over in a vehicle width direction.

More specifically, the right air bag 22R has an L shape including: an air bag base portion 24a extending in the vehicle width direction along the cowl portion 10; and an air bag side portion 24b extending upward from a right end of the air bag base portion 24a along the right A-pillar 8. The left air bag 22L and the right air bag 22R are bilaterally symmetrical in shape in a plan view, i.e., the left air bag 22L has an inverted L shape including: an air bag base portion 24a extending in the vehicle width direction along the cowl portion 10; and an air bag side portion 24b extending upward from a left end of the air bag base portion 24a along the left A-pillar 8.

Figure 5A:
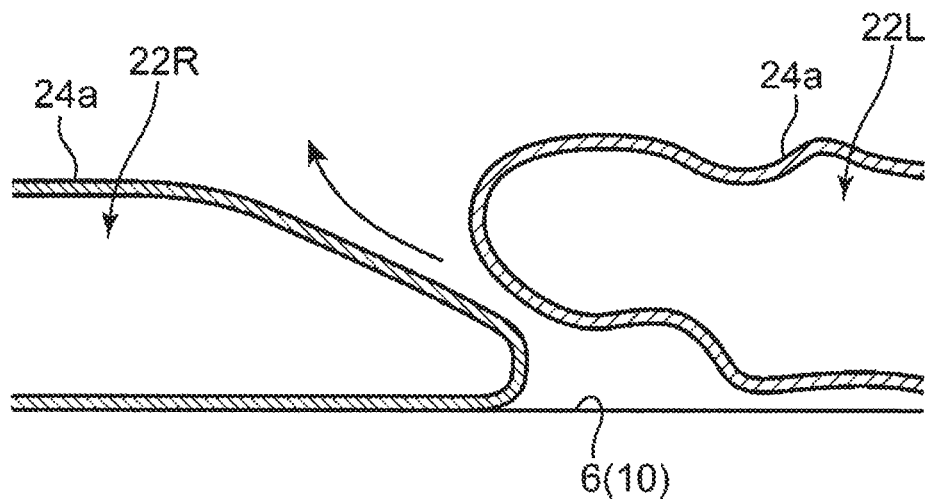
FIGS. 5A and 5B are schematic sectional views of the vehicle for explaining a process of deployments of the air bag devices.
Figure 5B:
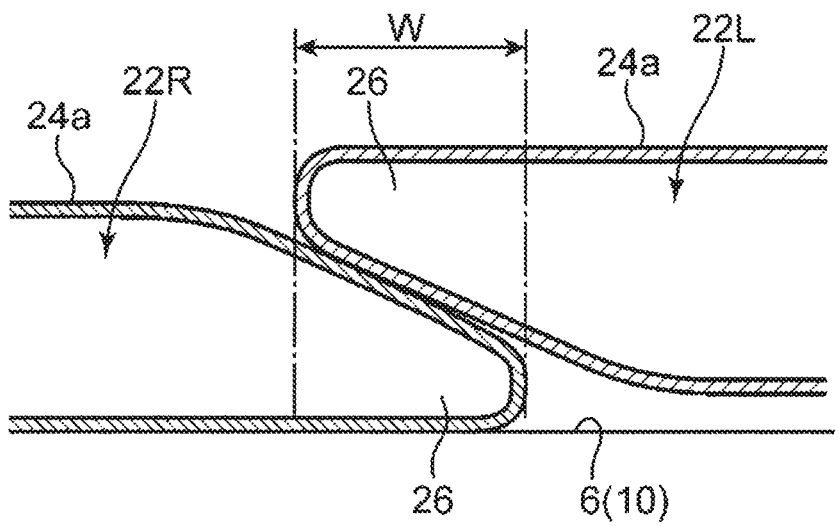

As shown in FIG. 3, the air bag base portions 24a of the air bags 22R and 22L are formed so as to vertically overlap each other at the vehicle width direction middle portion of the windshield 6 and the vehicle width direction middle portion of the cowl portion 10 while the air bag base portions 24a maintain a certain thickness as a whole. Specifically, as shown in FIG. 5B, a tip end portion (left end portion) 26 of the air bag base portion 24a of the right air bag 22R has such a wedge shape that an upper surface thereof is inclined downward from a right side toward a left side so as to approach a lower surface thereof. Further, a tip end portion (right end portion) 26 of the air bag base portion 24a of the left air bag 22L has such a wedge shape that a lower surface thereof is inclined upward from the left side toward the right side so as to approach an upper surface thereof. With this, as shown in FIG. 5B, the tip end portion 26 of the air bag base portion 24a of the left air bag 22L gets on the tip end portion 26 of the air bag base portion 24a of the right air bag 22R, and the air bag base portions 24a of the air bags 22R and 22L overlap each other at the vehicle width direction middle portion of the vehicle 1 by a predetermined width W.

Each of the air bags 22R and 22L is formed such that when the air bag is deployed, a portion of the air bag other than the tip end portion 26 has a substantially constant thickness. The tip end portions 26 of the air bag base portions 24a are formed such that a thickness of the overlapping tip end portions 26 is substantially equal to the thickness of the other portion (portion of the air bag other than the tip end portion 26). With this, the deployed air bags 22R and 22L have a substantially constant thickness as a whole.

The pop-up actuators 28 configured to perform the pop-up of the hood 4 are provided in the engine room 2 in front of the respective air bag devices 20R and 20L. Each of the pop-up actuators 28 includes: an actuator main body portion 29a in which an inflator (not shown) is incorporated; and a rod 29b supported by the actuator main body portion 29a so as to be projectable upward. When below-described G sensors 30a-30d detect collision with the pedestrian, the inflator operates, and as shown in FIG. 4, the rod 29b projects from the actuator main body portion 29a to perform the pop-up of the hood 4. Although not shown in FIGS. 2 and 4, a reinforced portion is provided at the rear surface of the hood 4, and the rod 29b pushes up the hood 4 through the reinforced portion from below.

The air bag devices 20R and 20L and the pop-up actuator 28 operate when the vehicle 1 collides with the pedestrian. The collision is detected by the four G sensors 30a-30d arranged at a rear side of the bumper face 3. Each of the G sensors 30a-30d detects acceleration or deceleration generated in a front-rear direction of the vehicle 1 by the application of a collision load and outputs a detection signal to an ECU (electrical control unit) 32. The ECU 32 integrally controls the vehicle 1. As is well known, the ECU 32 is constituted by a microprocessor including a CPU, a ROM, a RAM, etc. The ECU 32 operates the pop-up actuators 28 and the air bag devices 20R and 20L based on the detection signals input from the G sensors 30a-30d.

The ECU 32 operates the air bag devices 20R and 20L and the pop-up actuators 28 based on an operation program stored in the ECU 32. An operation timing is programmed in the operation program such that: the pop-up actuators 28 operate based on the input of the detection signal from any of the G sensors 30a-30d; and the air bag devices 20R and 20L operate at a timing at which the pop-up of the hood 4 is started. Regarding the air bag devices 20R and 20L, the operation timing is programmed such that the right air bag device 20R operates slightly before the left air bag device 20L operates. To be specific, after the deployment of the right air bag 22R is completed, the deployment of the left air bag 22L is completed.

Operational Advantages

According to the vehicle 1, when the detection signal is input from any of the G sensors 30a-30d to the ECU 32, and with this, the collision of the vehicle 1 with the pedestrian is detected, the pop-up actuators 28 and the air bag devices 20R and 20L operate. With this, the air bags 22R and 22L are deployed from between the hood 4 and the cowl portion 10 toward the windshield 6. When the air bags 22R and 22L are deployed, the tip end portions 26 of the air bag base portions 24a overlap each other at the vehicle width direction middle portion of the vehicle 1, and with this, a gap is prevented from being formed between the right and left air bags 22R and 22L. Therefore, the pedestrian is effectively prevented from getting into the gap between the right and left air bags 22R and 22L.

In addition, as described above, the operations of the air bag devices 20R and 20L are controlled by the ECU 32 such that the deployment of the left air bag 22L is completed after the deployment of the right air bag 22R is completed. Therefore, a phenomenon in which the tip end portions of the right and left air bags 22R and 22L hit against each other and bounce hardly occurs during the deployments. On this account, the tip end portions 26 of the right and left air bags 22R and 22L smoothly overlap each other.

In this case, in the vehicle 1, the right air bag 22R is deployed before the left air bag 22L is deployed. Therefore, there is an advantage that the air bag that is deployed first can be prevented from being influenced by the wiper device 14, in other words, the right and left air bags 22R and 22L can be more surely deployed with a time difference.

To be specific, when the wiper device 14 is not in use in the vehicle 1, the wipers 14R and 14L are arranged at the storage positions shown in FIG. 1. Therefore, if the left air bag 22L is deployed first, the left air bag 22L may collide with the wiper arm 15 of the right wiper 14R or may be caught by a left tip end of the wiper blade 16 of the right wiper 14R in the process of the deployment, and this may delay the deployment. As a result, the tip end portions 26 of the right and left air bags 22R and 22L may, for example, hit against each other and bounce, and this may inhibit the smooth deployments. In contrast, when the right air bag 22R is deployed first, the right air bag 22R is deployed on the windshield 6 along an upper portion of the wiper arm 15. Therefore, a phenomenon in which the right air bag 22R collides with the wiper arm 15 of the right wiper 14R or is caught by the wiper blade 16 and this inhibits the deployment of the right air bag 22R hardly occurs. On this account, according to the above embodiment in which the right air bag 22R is deployed first, the air bag (i.e., the right air bag 22R) that is deployed first can be more surely deployed, and with this, the right and left air bags 22R and 22L can be surely deployed with a time difference. Thus, according to the vehicle 1, the right and left air bags can be more smoothly and surely deployed while overlapping each other.

In addition, the right air bag 22R has such a shape that the upper surface of the tip end portion 26 is inclined downward toward a tip end thereof, and the left air bag 22L has such a shape that the lower surface of the tip end portion 26 is inclined upward toward a tip end thereof. To be specific, each of the upper surface of the tip end portion 26 of the right air bag 22R and the lower surface of the tip end portion 26 of the left air bag 22L serves as a guide surface (corresponding to a guide portion of the present invention) which guides the tip end portion 26 of the left air bag 22L to an upper side of the tip end portion 26 of the right air bag 22R. Therefore, when the right air bag 22R is deployed first as described above, as shown in FIGS. 5A and 5B, the tip end portion 26 of the left air bag 22L easily overlap the upper side of the tip end portion 26 of the right air bag 22R while being guided. On this account, in this respect, according to the vehicle 1, the right and left air bags 22R and 22L can be more smoothly and surely deployed while overlapping each other.

According to the vehicle 1, the level difference portions 13 are formed at respective portions of the cowl grill 12 which portions correspond to respective movable regions of the wipers 14R and 14L (wiper arms 15), and the right and left wipers 14R and 14L are provided at the respective level difference portions 13. According to this configuration, the wipers 14R and 14L hardly disturb the deployments of the air bags 22R and 22L. Therefore, in this respect, there is an advantage that the air bags 22R and 22L can be smoothly and surely deployed.

According to the vehicle 1, the pop-up actuators 28 operate, and the air bag devices 20R and 20L operate at a timing at which the pop-up of the hood 4 is started. Therefore, with this, there is an advantage that the air bags 22R and 22L can be deployed as quickly as possible while assisting the pop-up of the hood 4 by the deployments of the air bags 22R and 22L.

Others, Modified Examples, etc.

The vehicle 1 is an example of a preferred embodiment of the vehicle 1 to which the pedestrian protecting device according to the present invention is applied. A specific configuration of the vehicle 1 may be suitably changed within the scope of the present invention. For example, the following configurations may be adopted.

(1) In the above embodiment, the ECU 32 controls the operations of the air bag devices 20R and 20L such that deployment completion timings of the air bags 22R and 22L are made different from each other. However, the air bags 22R and 22L may be structurally made different from each other such that the deployment completion timings of the air bags 22R and 22L become different from each other although the air bag devices 20R and 20L are simultaneously operated. As one example, the configurations of the air bags 22R and 22L shown in FIG. 6 may be adopted.

Figure 6:
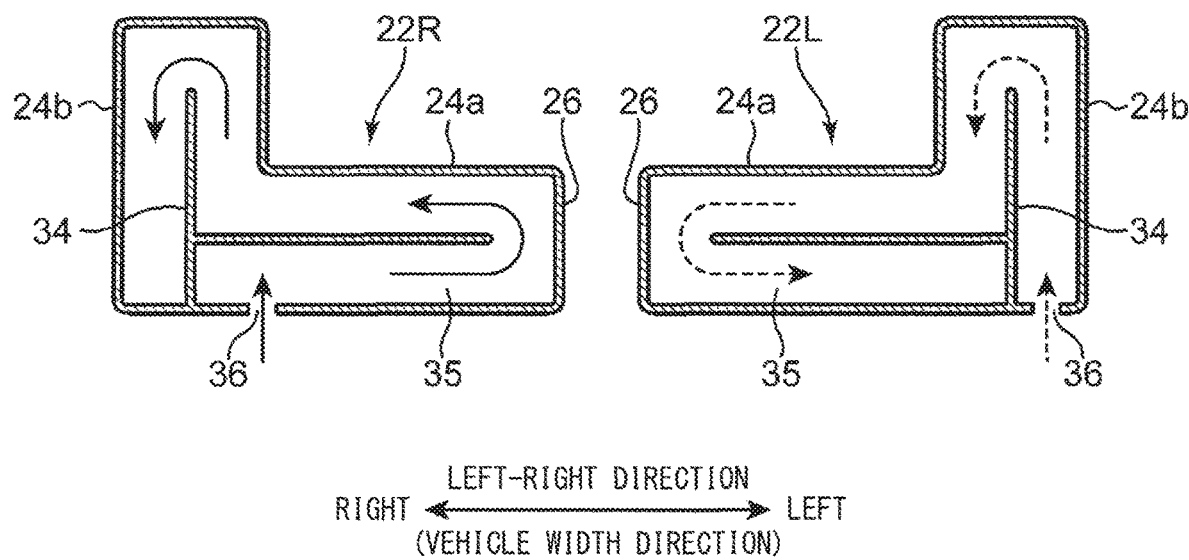
FIG. 6 is a sectional view showing a right air bag and a left air bag according to Modified Example.

FIG. 6 is a sectional view showing the first and second air bags 22R and 22L which are being deployed. As shown in FIG. 6, in each of the first and second air bags 22R and 22L, a deployment gas channel 35 is formed by a partition wall 34. Further, a gas inlet 36 is formed on a side surface of the air bag base portion 24a.

The deployment gas channel 35 of the right air bag 22R is formed such that: as shown by solid line arrows in FIG. 6, gas introduced through the inlet 36 flows along the air bag base portion 24a toward the tip end portion 26; the gas makes a U-turn thereat and then flows in an opposite direction; the gas further flows from a base end portion of the air bag side portion 24b toward a tip end portion of the air bag side portion 24b; and the gas makes a U-turn thereat. To be specific, the deployment gas channel 35 of the right air bag 22R is formed such that the air bag base portion 24a is filled with the gas before the air bag side portion 24b is filled with the gas.

In contrast, the deployment gas channel 35 of the left air bag 22L is formed such that the gas is filled through a route opposite to the route of the right air bag 22R. To be specific, the deployment gas channel 35 of the left air bag 22L is formed such that: as shown by broken line arrows in FIG. 6, the gas introduced through the inlet 36 flows from a base end portion of the air bag base portion 24a along the air bag side portion 24b toward a tip end portion of the air bag side portion 24b; the gas makes a U-turn thereat and then flows to the air bag base portion 24a; the gas further flows along the air bag base portion 24a toward the tip end portion 26 of the air bag base portion 24a; and the gas makes a U-turn thereat. To be specific, the deployment gas channel 35 of the left air bag 22L is formed such that the air bag side portion 24b is filled with the gas before the air bag base portion 24a is filled with the gas.

According to the configurations of the air bags 22R and 22L, the air bag base portion 24a is first deployed in the right air bag 22R, and the air bag side portion 24b is first deployed in the left air bag 22L. Therefore, even when the air bag devices 20R and 20L are simultaneously operated, the deployment of the tip end portion 26 of the right air bag 22R is completed before the deployment of the tip end portion 26 of the left air bag 22L is completed. On this account, this configuration can obtain the same operational advantages as the above-described vehicle 1.

Figure 7:
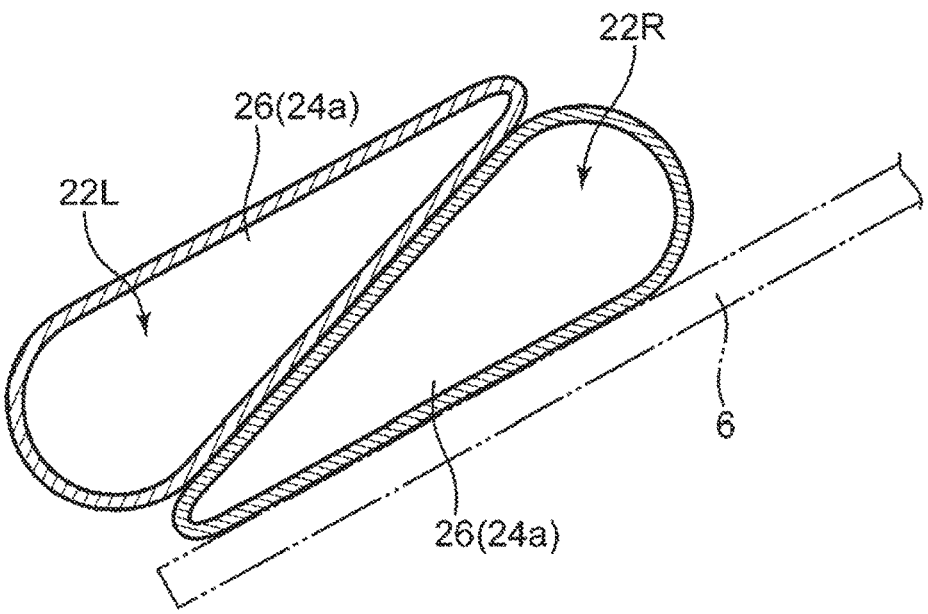
FIG. 7 is a sectional view showing the right air bag and the left air bag according to Modified Example.

(2) Specific shapes of the air bags 22R and 22L can be suitably changed from the viewpoint of the improvement in deployment performance and pedestrian impact absorption ability. For example, the tip end portions 26 of the air bag base portions 24a of the air bags 22R and 22L may have sectional shapes shown in FIG. 7. To be specific, in the example shown in FIG. 7, a front side of the tip end portion 26 of the right air bag 22R is thinner than a rear side of the tip end portion 26 of the right air bag 22R, and a rear side of the tip end portion 26 of the left air bag 22L is thinner than a front side of the tip end portion 26 of the left air bag 22L. According to this configuration, the left air bag 22L (tip end portion 26) located at an upper side hardly moves backward, and therefore, the pedestrian impact absorption ability further improves.

(3) In the above embodiment, as shown in FIG. 5B, the guide surfaces are provided at the respective tip end portions 26 such that the tip end portion 26 of the left air bag 22L (air bag base portion 24a) surely overlaps the tip end portion 26 of the right air bag 22R (air bag base portion 24a). To be specific, the upper surface of the tip end portion 26 of the right air bag 22R is inclined downward toward the lower surface thereof, and the lower surface of the tip end portion 26 of the left air bag 22L is inclined upward toward the upper surface thereof. However, the guide surface may be provided at only one of the tip end portions 26 of the right air bag 22R.

Each of the sectional shapes of the tip end portions 26 of the air bags 22R and 22L (i.e., the shapes of the sections corresponding to FIG. 5B) may be a simple tapered shape that uniformly changes in thickness with respect to a thickness direction center. As long as the tip end portions 26 of the air bags 22R and 22L can satisfactorily overlap each other when the deployments are completed, each of the tip end portions 26 does not have to have a tapered shape (wedge shape) and may have a constant thickness.

(4) In the above embodiment, the tip end portion 26 of the left air bag 22L overlaps the upper side of the tip end portion 26 of the right air bag 22R. However, needless to say, the tip end portion 26 of the right air bag 22R may overlap the upper side of the tip end portion 26 of the left air bag 22L. To be specific, the tip end portion 26 of the left air bag 22L may get under the tip end portion 26 of the right air bag 22R that is deployed first. In this case, for example, it is preferable that the tip end portions 26 of the air bags 22R and 22L be formed such that the sectional shapes of the tip end portions 26 of the air bags 22R and 22L (i.e., the shapes of the guide surfaces) are opposite to those in the example shown in FIG. 5B.

(5) Although not especially mentioned in the above embodiment, the ECU 32 may change the operation timings of the air bag devices 20R and 20L in accordance with whether or not the wiper device 14 is operating. Specifically, the ECU 32 may control the operations of the air bag devices 20R and 20L such that: when the wiper device 14 is in a stop state, the air bag devices 20R and 20L are simultaneously operated; and only when the wiper device 14 is operating, the right air bag device 20R is operated before the left air bag device 20L is operated.

To be specific, while the wipers are operating, especially the left wiper 14L tends to disturb the deployment of the left air bag 22L. Therefore, only in such a case, the air bags may be deployed with a time difference.

(6) The vehicle 1 of the above embodiment is a right-hand drive vehicle. However, the present invention is also applicable to a left-hand drive vehicle. In this case, the directions of the wipers 14R and 14L of the wiper device 14 are opposite to the directions of FIG. 1 in a left-right direction. Therefore, the deployment of the left air bag 22L is only required to be completed before the deployment of the right air bag 22R is completed, and the tip end portion 26 of the right air bag 22R (air bag base portion 24a) is only required to overlap the upper side of the tip end portion 26 of the left air bag 22L (air bag base portion 24a). According to this configuration, the left-hand drive vehicle 1 can obtain the same operational advantages as the right-hand drive vehicle 1. In this case, the left air bag device 20L corresponds to the first air bag device of the present invention, and the right air bag device 20R corresponds to the second air bag device of the present invention. Further, the left wiper 14L corresponds to the first wiper of the present invention, and the right wiper 14R corresponds to the second wiper of the present invention.

In some cases, the right-hand drive vehicle 1 includes the same wiper device 14 as the left-hand drive vehicle 1. In this case, such right-hand drive vehicle 1 is only required to be equipped with the same pedestrian protecting device as the left-hand drive vehicle. In contrast, if the left-hand drive vehicle 1 includes the same wiper device 14 as the right-hand drive vehicle 1, such left-hand drive vehicle 1 is only required to be equipped with the same pedestrian protecting device as the right-hand drive vehicle.

(7) In the above embodiment, the air bag devices 20R and 20L are arranged at the rear surface of the hood 4. However, the air bag devices 20R and 20L may be arranged at the cowl portion 10. Or, one of the air bag devices 20R and 20L may be arranged at the rear surface of the hood 4, and the other of the air bag devices 20R and 20L may be arranged at the cowl portion 10. Examples of the above case where the air bag devices 20R and 20L are arranged at the cowl portion 10 include: a case where the air bag devices 20R and 20L are fixed to an upper surface of the cowl portion 10; and a case where the air bag devices 20R and 20L are fixed inside the cowl portion 10, and the air bags 22R and 22L are deployed from the cowl portion 10.

REFERENCE CHARACTERS LIST 1 vehicle
4 hood
6 windshield
10 cowl portion
12 cowl grill
14 wiper device
14R right wiper (first wiper)
14L left wiper (second wiper)
20 pedestrian air bag device
20R right air bag device (first air bag device)
20L left air bag device (second air bag device)
22R right air bag (first air bag)
22L left air bag (second air bag)
24a air bag base portion
24b air bag side portion
26 tip end portion
32 ECU (controller)

The invention claimed is:

1. A pedestrian protecting device mounted on a vehicle, the vehicle including: a pair of wipers arranged at a cowl portion located in front of a windshield, the wipers being configured to swing in the same direction; and a hood covering an engine room and including a rear end portion located above the cowl portion, the pedestrian protecting device comprising:
when one side of a middle portion of the vehicle in a vehicle width direction is defined as a first region, and the other side of the middle portion of the vehicle in the vehicle width direction is defined as a second region,
a first air bag device arranged under the rear end portion of the hood in the first region, the first air bag device including a first air bag configured to be deployed at a portion of the windshield which portion belongs to the first region; and
a second air bag device arranged under the rear end portion of the hood in the second region, the second air bag device including a second air bag configured to be deployed at a portion of the windshield which portion belongs to the second region, wherein:
the pair of wipers includes
a first wiper configured to mainly wipe the portion of the windshield which portion belongs to the first region, and
a second wiper configured to mainly wipe the portion of the windshield which portion belongs to the second region, the second wiper including a turning fulcrum located at a position closer to the middle portion of the vehicle than a turning fulcrum of the first wiper;
the first and second air bags include respective tip end portions which vertically overlap each other at the middle portion of the vehicle in the vehicle width direction;
a deployment of the tip end portion of the first air bag of the first air bag device is completed before a deployment of the tip end portion of the second air bag of the second air bag device is completed;
the vehicle includes pillar portions extending in an upper-lower direction, the pillar portions being located at both respective vehicle width direction ends of the windshield;
the tip end portion of the first air bag of the first air bag device is filled with deployment gas before an end portion, located close to the corresponding pillar portion, of the first air bag of the first air bag device is filled with the deployment gas; and
an end portion, located close to the corresponding pillar portion, of the second air bag of the second air bag device is filled with the deployment gas before the tip end portion of the second air bag of the second air bag device is filled with the deployment gas.

2. The pedestrian protecting device according to claim 1, wherein at least one of the first air bag and the second air bag includes a guide portion configured to guide the tip end portion of the second air bag to an upper side of the tip end portion of the first air bag.

3. The pedestrian protecting device according to claim 1, wherein:
each of the first and second air bags includes an air bag base portion extending in the vehicle width direction along the cowl portion, an air bag side portion extending from the air bag base portion in the upper-lower direction along the corresponding pillar portion, and a deployment gas channel formed in the air bag base portion and the air bag side portion;

the deployment gas channel of the first air bag has such a shape that the air bag base portion is filled with the deployment gas before the air bag side portion is filled with the deployment gas; and the deployment gas channel of the second air bag has such a shape that the air bag side portion is filled with the deployment gas before the air bag base portion is filled with the deployment gas.

4. The pedestrian protecting device according to claim 1, comprising a controller configured to control operations of the first and second air bag devices such that the first air bag is operated before the second air bag is operated.

5. The pedestrian protecting device according to claim 1, wherein:

the tip end portion of the second air bag has a shape that tapers from a front side toward a rear side in a vehicle front-rear direction; and the tip end portion of the first air bag has a shape that tapers from the rear side toward the front side.

6. A pedestrian protecting device mounted on a vehicle, the vehicle including: a pair of wipers arranged at a cowl portion located in front of a windshield, the wipers being configured to swing in the same direction; and a hood covering an engine room and including a rear end portion located above the cowl portion, the pedestrian protecting device comprising:

when one side of a middle portion of the vehicle in a vehicle width direction is defined as a first region, and the other side of the middle portion of the vehicle in the vehicle width direction is defined as a second region, a first air bag device arranged under the rear end portion of the hood in the first region, the first air bag device including a first air bag configured to be deployed at a portion of the windshield which portion belongs to the first region; and a second air bag device arranged under the rear end portion of the hood in the second region, the second air bag device including a second air bag configured to be deployed at a portion of the windshield which portion belongs to the second region, wherein:

the pair of wipers includes a first wiper configured to mainly wipe the portion of the windshield which portion belongs to the first region, and a second wiper configured to mainly wipe the portion of the windshield which portion belongs to the second region, the second wiper including a turning fulcrum located at a position closer to the middle portion of the vehicle than a turning fulcrum of the first wiper;

the first and second air bags include respective tip end portions which vertically overlap each other at the middle portion of the vehicle in the vehicle width direction;

a deployment of the tip end portion of the first air bag of the first air bag device is completed before a deployment of the tip end portion of the second air bag of the second air bag device is completed;

the pedestrian protecting device comprises a controller configured to control operations of the first and second air bag devices such that the first air bag is operated before the second air bag is operated; and the controller controls the operations of the first and second air bag devices such that only when the first wiper is operating, the first air bag is operated before the second air bag is operated.

7. A pedestrian protecting device mounted on a vehicle, the vehicle including: a pair of wipers arranged at a cowl portion located in front of a windshield, the wipers being configured to swing in the same direction; and a hood covering an engine room and including a rear end portion located above the cowl portion, the pedestrian protecting device comprising:

when one side of a middle portion of the vehicle in a vehicle width direction is defined as a first region, and the other side of the middle portion of the vehicle in the vehicle width direction is defined as a second region, a first air bag device arranged under the rear end portion of the hood in the first region, the first air bag device including a first air bag configured to be deployed at a portion of the windshield which portion belongs to the first region; and a second air bag device arranged under the rear end portion of the hood in the second region, the second air bag device including a second air bag configured to be deployed at a portion of the windshield which portion belongs to the second region, wherein:

the pair of wipers includes a first wiper configured to mainly wipe the portion of the windshield which portion belongs to the first region, and a second wiper configured to mainly wipe the portion of the windshield which portion belongs to the second region, the second wiper including a turning fulcrum located at a position closer to the middle portion of the vehicle than a turning fulcrum of the first wiper;

the first and second air bags include respective tip end portions which vertically overlap each other at the middle portion of the vehicle in the vehicle width direction;

a deployment of the tip end portion of the first air bag of the first air bag device is completed before a deployment of the tip end portion of the second air bag of the second air bag device is completed;

the cowl portion includes a cowl grill, the cowl grill including a level difference portion, a rear side of the level difference portion being located lower than a front side of the level difference portion; and the first and second wipers are arranged at the level difference portion.

* * * * *